(12) United States Patent
Wynne et al.

(10) Patent No.: US 11,584,085 B2
(45) Date of Patent: Feb. 21, 2023

(54) SCALABLE AND FAST THREE DIMENSIONAL PRINTING SYSTEM

(71) Applicant: 3D Systems, Inc., Rock Hill, SC (US)

(72) Inventors: Ben Wynne, Escondido, CA (US); Robert Mueller, San Diego, CA (US)

(73) Assignee: 3D Systems, Inc., Rock Hill, SC (US)

(*) Notice: Subject to any disclaimer, the term of this patent is extended or adjusted under 35 U.S.C. 154(b) by 320 days.

(21) Appl. No.: 17/019,600

(22) Filed: Sep. 14, 2020

(65) Prior Publication Data
US 2020/0406601 A1    Dec. 31, 2020

Related U.S. Application Data

(63) Continuation of application No. 15/425,289, filed on Feb. 6, 2017, now Pat. No. 10,773,510.

(51) Int. Cl.
| | |
|---|---|
| *B29C 64/386* | (2017.01) |
| *B29C 64/135* | (2017.01) |
| *B29C 64/277* | (2017.01) |
| *B33Y 50/02* | (2015.01) |
| *B33Y 30/00* | (2015.01) |

(Continued)

(52) U.S. Cl.
CPC .......... *B29C 64/386* (2017.08); *B29C 64/135* (2017.08); *B29C 64/277* (2017.08); *B33Y 30/00* (2014.12); *B33Y 50/00* (2014.12); *B33Y 50/02* (2014.12); *B29K 2105/0058* (2013.01)

(58) Field of Classification Search
CPC ... B29C 64/386; B29C 64/135; B29C 64/277; B33Y 30/00; B33Y 50/00; B33Y 50/02; B29K 2105/0058
See application file for complete search history.

(56) References Cited

U.S. PATENT DOCUMENTS

| | | |
|---|---|---|
| 8,636,496 B2 | 1/2014 | Das et al. |
| 9,403,322 B2 | 8/2016 | Das et al. |
| 9,561,622 B2 | 2/2017 | Das et al. |

(Continued)

FOREIGN PATENT DOCUMENTS

| | | |
|---|---|---|
| CN | 105163922 | 12/2014 |
| JP | 63145015 | 6/1988 |

(Continued)

OTHER PUBLICATIONS

English Translation of Japanese First Office Action for Japanese Application No. 2018-545886 dated Sep. 5, 2019 (4 pages).

(Continued)

*Primary Examiner* — Joseph S Del Sole
*Assistant Examiner* — Baileigh Kate Darnell

(57) ABSTRACT

A three dimensional printing system includes a light engine having a spatial light modulator for curing individual layers of a photocure resin to form a three dimensional article of manufacture. The light engine is configured to: (1) receive a slice image that defines an array of energy values for curing a layer, (2) process the slice image to define an image frame compatible with the spatial light modulator, (3) receive an on signal, (4) activate the first light source in response to the on signal; (5) repeatedly send the first defined image frame to the first spatial light modulator during a defined cure time for the single layer of resin; (6) receive an off signal; (7) deactivate the first light source in response to the off signal; and (8) repeat steps (1)-(7) until the three dimensional article of manufacture is formed.

20 Claims, 9 Drawing Sheets

(51) Int. Cl.
    *B33Y 50/00*     (2015.01)
    *B29K 105/00*     (2006.01)

(56) References Cited

U.S. PATENT DOCUMENTS

| | | |
|---|---|---|
| 10,336,055 B2 | 7/2019 | Das et al. |
| 2007/0063996 A1 | 3/2007 | Childers |
| 2008/0315461 A1 | 12/2008 | Henningsen |
| 2010/0003619 A1 | 1/2010 | Das |
| 2010/0125356 A1 | 5/2010 | Shkolnik et al. |
| 2014/0371895 A1 | 12/2014 | Sadusk et al. |
| 2015/0137426 A1 | 5/2015 | Van Esbroeck et al. |
| 2016/0221262 A1 | 4/2016 | Das et al. |
| 2016/0185044 A1 | 6/2016 | Leonard et al. |
| 2016/0227184 A1 | 8/2016 | Nims |
| 2016/0250810 A1 | 9/2016 | Lynch et al. |
| 2017/0087766 A1 | 3/2017 | Chung |
| 2019/0091988 A1 | 3/2019 | Das et al. |

FOREIGN PATENT DOCUMENTS

| | | |
|---|---|---|
| JP | 2016540665 | 12/2016 |
| WO | 2014074954 | 5/2014 |

OTHER PUBLICATIONS

English Translation of Chinese First Office Action for Chinese Application No. 201880001390.0 dated Dec. 4, 2019 (16 pages).
PCT International Search Report of the International Searching Authority for PCT/US2018/016070, dated Jun. 20, 2018 (10 pages).
PCT Written Opinion of the International Searching Authority for PCT/US2018/016070, dated Jun. 20, 2018 (8 pages).
European Extended Search Report for European Application No. 21173113.8 dated Aug. 23, 2021 (14 pages).

SCALABLE AND FAST THREE DIMENSIONAL PRINTING SYSTEM

CROSS REFERENCE TO RELATED APPLICATION

This application is a continuation of copending U.S. patent application Ser. No. 15/425,289, filed Feb. 6, 2017, which is hereby incorporated herein in its entirety by reference.

FIELD OF THE INVENTION

The present disclosure concerns an apparatus and method for the digital fabrication of three dimensional articles of manufacture through the solidification of liquid photoncurable (photocure) resins. More particularly, the present disclosure concerns an advantageous method of controlling a light engine that is scalable from one to multiple light engines in a three dimensional printing system.

BACKGROUND

Three dimensional printers are in widespread use. Examples of three dimensional printer technologies includes stereolithography, selective laser sintering, and fused deposition modeling to name a few. Stereolithography-based printers utilize a controllable light engine to selectively harden or solidify a liquid photocure resin one layer at a time. In some embodiments the light engine includes a light source that illuminates a spatial light modulator.

Some of these light engines originate from projectors that are used for displaying images and video. When these light engines are used for three dimensional printers, certain inefficiencies result because these light engines have electronics optimized for the display of full motion video. There is a need to redesign the electronics to be optimal for three dimensional printing.

SUMMARY

Figure 1:
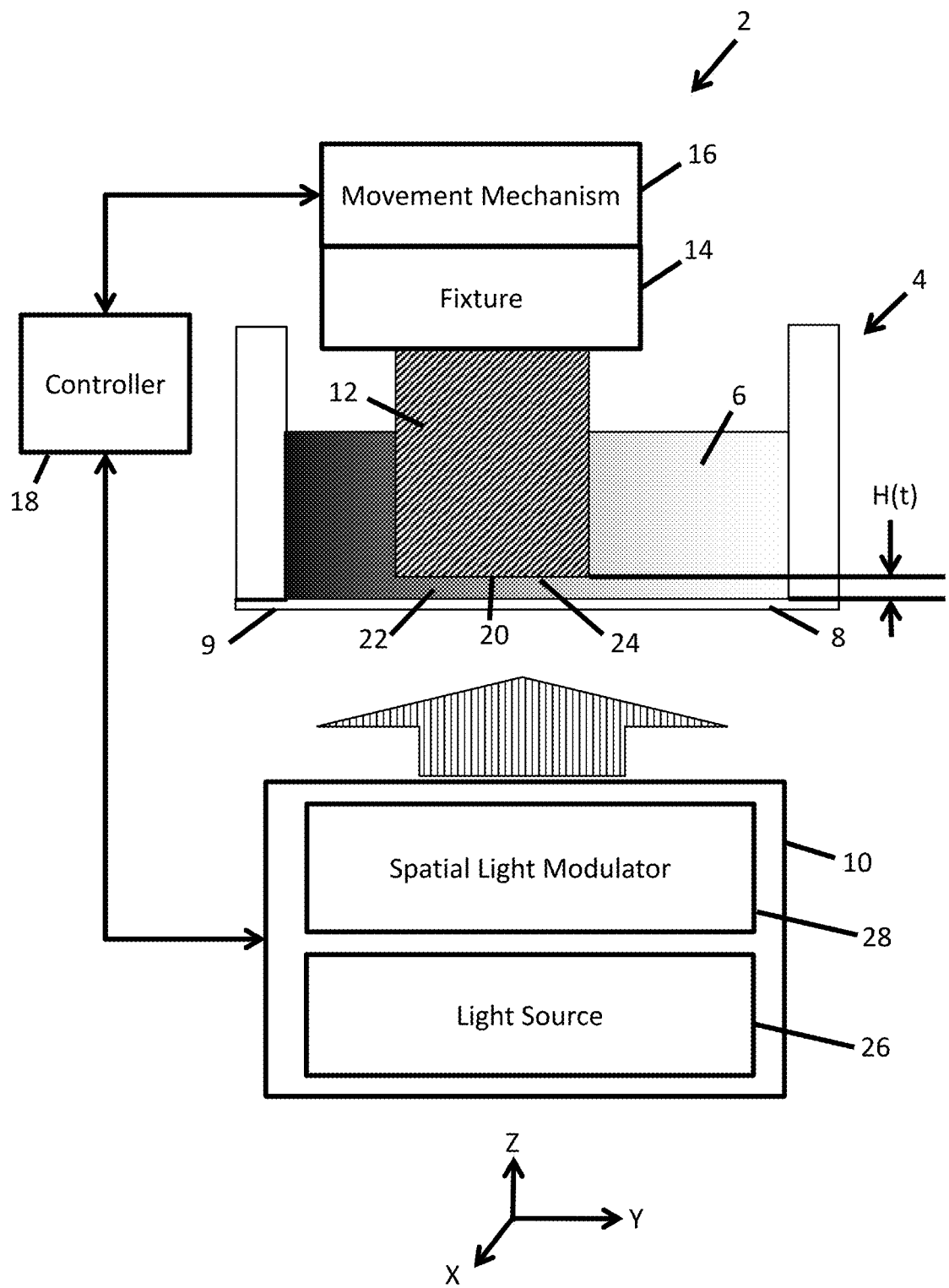
FIG. 1 is a schematic block diagram of a three dimensional printing system.

In a first aspect of the invention, a three dimensional printing system includes a vessel for containing photocure resin, a fixture for supporting a three dimensional article of manufacture, a movement mechanism for incrementally displacing the fixture, a light engine, and a controller that is electrically or wirelessly coupled to the movement mechanism and the light engine. The vessel includes a lower surface having a transparent sheet in contact with the photocure resin. The three dimensional article of manufacture has a lower face that is in facing relation with the transparent sheet. The light engine is configured to apply pixelated light through the sheet and to the lower face in order to solidify thin slices of the photocure resin proximate to a build plane. The build plane defines a lateral area that the light engine is capable of curing. The controller activates the light engine to perform the following steps: (a) receive a first incoming slice energy data array; (b) process the first incoming slice energy data array to define a first image frame; (c) receive an on signal; (d) activate the first light source in response to the on signal; (e) repeatedly send the first defined image frame to the first spatial light modulator during a defined cure time for a layer of the resin; (f) receive an off signal; (g) deactivate the first light source in response to the off signal; and (h) repeat steps (a)-(g) until the three dimensional article of manufacture is formed.

In one implementation the light engine includes a system processor coupled to a digital mirror device module and a light source module. In one embodiment the digital mirror device module includes an image scaler, a digital mirror device formatter, and a digital mirror device. The image scaler processes the received first slice image to do one or more of correction, calibration, scaling, and stitching and to provide a scaled energy data array. The digital mirror device formatter converts the scaled energy data array into an image frame compatible with the digital mirror device. The digital mirror device includes a digital mirror array which includes at least one million individually addressable mirror elements. The light source module includes a light source driver coupled to a light source.

In another implementation the first image frame defines a sequence of bit planes for individual pixel elements of the first spatial light modulator. An energy value delivered for each pixel element is determined by which bit planes are in an "on" state. Thus, the first image frame is an array of binary numbers with bit positions in a binary number corresponding with a bit plane.

In yet another implementation the first light source is activated simultaneously with a "temporal leading edge" of one of the defined image frames. The temporal leading edge of an image frame is the left hand side of an image frame in a time domain—it is when the image frame begins to affect operation of the spatial light modulator. Thus the first light source is turned on simultaneously with the activation of the first spatial light modulator with one of the defined image frames.

In a further implementation an integer number of the defined image frames are received by the first spatial light modulator between the activation and the deactivation of the light source.

In a yet further implementation a non-integer number of the defined image frames are received by the spatial light modulator between the activation and the deactivation of the light source.

In another implementation the three dimensional printing system includes a second light engine including a second light source that illuminates a second spatial light modulator, the second light engine configured to: (a) receive a second incoming slice energy data array, the second incoming slice energy data array is complementary with the first incoming slice energy data array to allow the first and second light engines to have different but partially overlapping build fields; (b) process the incoming slice energy data array to define a second image frame; (c) receive the on signal from the first light engine; (d) activate the second light source in response to the on signal; (e) repeatedly send the second defined image frame to the second spatial light modulator during the defined cure time; (f) receive the off signal from the first light engine; (g) deactivate the second light source in response to the off signal; and (h) repeat steps (a)-(g) until the three dimensional article of manufacture is formed.

In yet another implementation the first light engine sends the incoming slice energy data array along a first data path to a digital mirror device module and sends the on and off signals along a second data path to a first light source module.

In a second aspect of the invention, a three dimensional printing system includes a vessel for containing photocure resin, a fixture for supporting a three dimensional article of manufacture, a movement mechanism for incrementally displacing the fixture, a light engine, and a controller that is electrically or wirelessly coupled to the movement mechanism and the light engine. The vessel includes a lower surface having a transparent sheet in contact with the photocure resin. The three dimensional article of manufacture has a lower face that is in facing relation with the transparent sheet. The light engine is configured to apply pixelated light through the sheet and to the lower face in order to solidify thin slices of the photocure resin proximate to a build plane. The build plane defines an area that the light engine is capable of curing. The light engine includes a light source, a spatial light modulator that is illuminated by the light source, a system processor for receiving an incoming slice energy data array and light source switching signals; an image scaler that receives and processes the incoming slice energy data array and outputs a scaled energy data array after one or more of correcting, calibrating, scaling, and stitching of the incoming slice energy data array; a digital mirror device formatter that receives and converts the scaled energy data into an image frame and repeatedly sends the image frame to the spatial light modulator; and a light source driver that receives the light source switching signals and turns the light source on for a cure time duration that overlaps with the repeated image frame. In a first embodiment turning the light source on is synchronized with the start of one of the image frames. In a second embodiment an integer number of the image frames are received by the spatial light modulator while the light source is on. In a third embodiment a non-integer number of the image frames are received by the spatial light modulator while the light source is on.

In one implementation the light engine is a plurality of light engines configured to cooperatively generate a composite build plane, the plurality of light engines receiving different but complementary incoming slice energy data arrays. The plurality of light engines includes a master light engine and at least one subsidiary light engine, the master light engine receives the switching signals and routes them to the at least one subsidiary light engine.

In a third aspect of the invention a three dimensional printing system includes a vessel for containing photocure resin, a fixture for supporting a three dimensional article of manufacture, a movement mechanism for incrementally displacing the fixture, a plurality of light engines, and a controller that is electrically or wirelessly coupled to the movement mechanism and the plurality of light engines. The vessel includes a lower surface having a transparent sheet in contact with the photocure resin. The three dimensional article of manufacture has a lower face that is in facing relation with the transparent sheet. The light engines are configured to apply pixelated light through the sheet and to the lower face in order to solidify thin slices of the photocure resin proximate to a composite build plane. The composite build plane defines an area that the light engine is capable of curing. The plurality of light engines include a master light engine and at least one subsidiary light engine. The master light engine includes a system processor that is configured to: (a) receive an incoming slice energy data array specific to the master light engine; (b) receive light source switching signals; (c) route the incoming slice energy data array specific to the master light engine to a digital mirror device module that is within the master light engine; (d) apply the switching signals to a light source module that is within the master light engine; and (e) route the switching signals to the at least one subsidiary light engine.

In one implementation the composite build plane is defined by a plurality of partially overlapping build fields. Each build field is individually formed by one of the plurality of light engines.

In another implementation the digital mirror device module includes an image scaler, a digital mirror device formatter, and a digital mirror device. The image scaler processes the incoming slice energy data array to define a scaled energy data array and the digital mirror device formatter processes the scaled energy data array to define an image frame. The switching signals include an on signal and an off signal. A cure time is defined by a time duration between the on signal and the off signal. The digital mirror device formatter is configured to sequentially send an integer number of image frames to the digital mirror device during the cure time.

In yet another implementation the digital mirror device module includes an image scaler, a digital mirror device formatter, and a digital mirror device. The image scaler processes the incoming slice energy data array to define a scaled energy data array and the digital mirror device formatter processes the scaled energy data array to define an image frame. The switching signals include an on signal and an off signal. A cure time is defined by a time duration between the on signal and the off signal. The digital mirror device formatter is configured to sequentially send a non-integer number of image frames to the digital mirror device during the cure time.

DETAILED DESCRIPTION OF THE PREFERRED EMBODIMENTS

FIG. 1 is a schematic block diagram of an exemplary three dimensional printing system 2. In describing this the following figures, mutually perpendicular axes X, Y and Z will be used. Axes X and Y are lateral axes. In some embodiments X and Y are also horizontal axes. Axis Z is a central axis. In some embodiments Z is a vertical axis. In some embodiments the direction +Z is generally upward and the direction −Z is generally downward.

Three dimensional printing system 2 includes a vessel 4 containing photocurable resin 6. Vessel 4 includes a transparent sheet 8 that defines at least a portion of a lower surface 9 of vessel 4. A light engine 10 is disposed to project light up through the transparent sheet 8 to solidify the photocure resin 6 and to thereby form the three dimensional article of manufacture 12. The three dimensional article of manufacture 12 is attached to a fixture 14. A movement mechanism 16 is coupled to fixture 14 for translating the fixture 14 along the vertical axis Z.

A controller 18 is electrically or wirelessly coupled to the light engine 10 and the movement mechanism 16. Controller 18 includes a processor (not shown) coupled to an information storage device (not shown). The information storage device includes a non-transient or non-volatile storage device (not shown) that stores instructions that, when executed by the controller 18 can be contained in a single IC (integrated circuit) or multiple ICs. Controller 18 can be at one location or distributed among multiple locations in three dimensional printing system 2. Processor controls the light engine 10 and the movement mechanism 16.

The three dimensional article of manufacture 12 has a lower face 20 that faces the transparent sheet 8. Between the lower face 20 and the transparent sheet 8 is a thin layer of resin 22. As light engine 10 applies light energy through the transparent sheet 8 it polymerizes resin proximate to a "build plane" 24 which can be coincident or proximate to the lower face 20.

Figure 2:
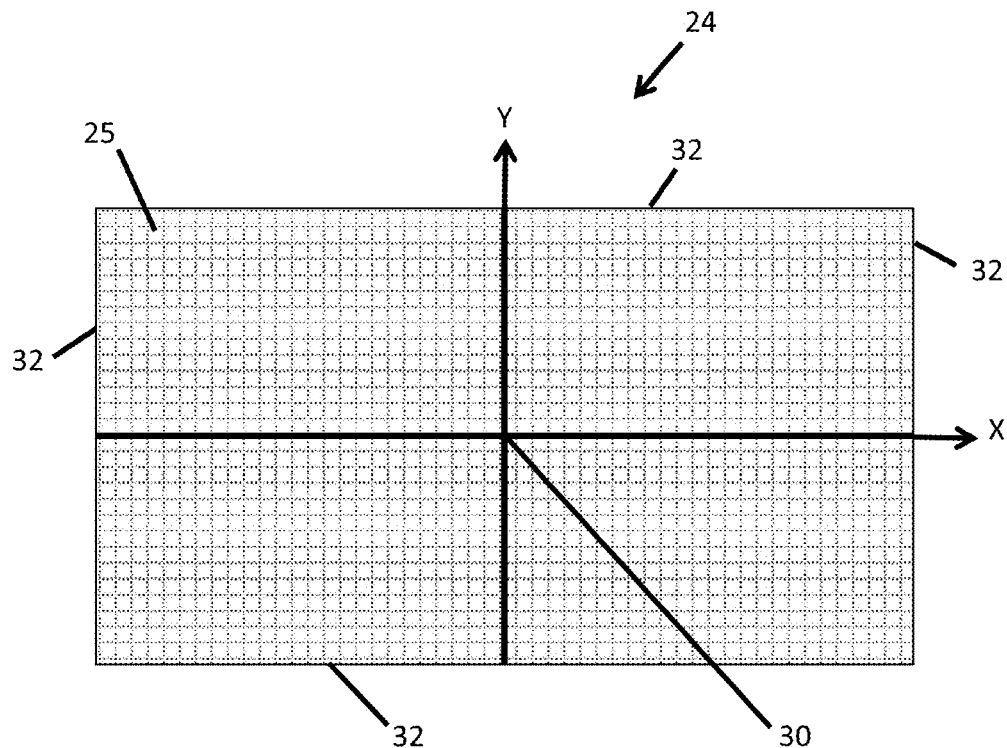
FIG. 2 is a diagram representing a build plane for a single light engine.
Figure 3:
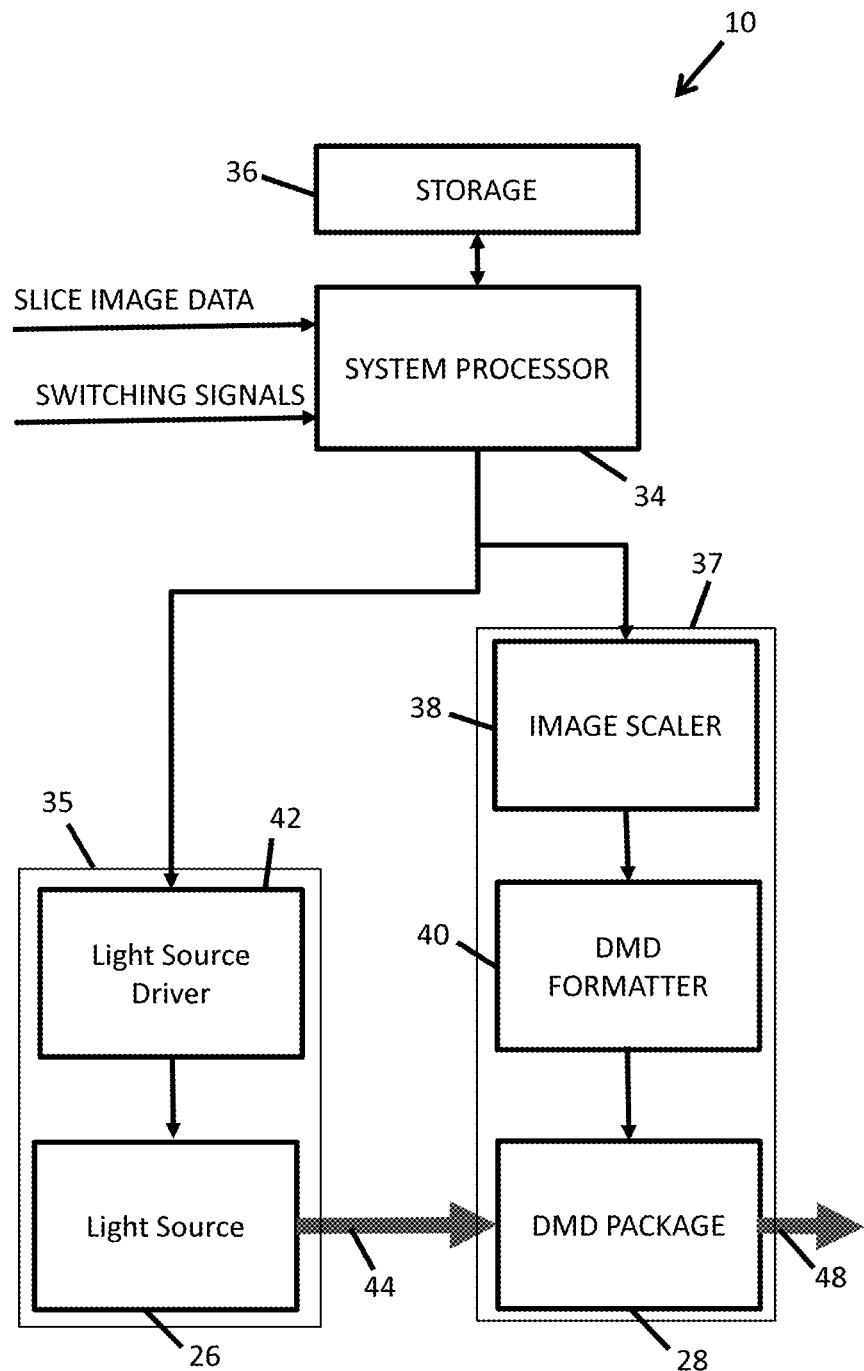
FIG. 3 is an electrical block diagram of an exemplary light engine.

The light engine 10 includes a light source 26, a spatial light modulator 28, and other devices (see FIG. 3). Light source 26 illuminates spatial light modulator 28 which generates a pixelated image that is projected up through the transparent film 8. In an exemplary embodiment, light source 26 includes one or more light emitting diodes and/or lasers. The light source 26 can generate blue or ultraviolet light for curing layers of resin 6. In an exemplary embodiment, the spatial light modulator 28 is a digital mirror device 28 that can include one million or more controllable mirror elements. Each mirror element (not shown) has at least two positions including an "on" position and an "off" position. In the "on" position it transmits light to illuminate a "pixel element" 25 of the build plane 24. In an "off" position it leaves that pixel 25 element dark. (FIG. 2 illustrates the build plane 24).

Controller 18 controls the light engine 10 to selectively harden a new layer of resin onto the lower face 20. After each layer of resin is hardened, controller 18 controls movement mechanism 16 to raise the three dimensional article of manufacture 12 to allow for replenishment of the thin layer of resin 22.

FIG. 2 depicts the lateral build plane 24 for a fixed value of Z. The lateral build plane 24 is defined a lateral extent of the light engine in X and Y for the fixed value of Z. The lateral build plane 24 has a center 30 and lateral edges 32. Lateral edges 32 define the lateral extent of the lateral build plane 24. While the lateral build plane 24 is shown as rectangular it is to be understood that distortions and other artifacts may render the lateral build plane 24 to have non-linear lateral edges 32 and/or a non-rectangular shape.

Within the lateral build plane 24 are pixel elements 25. Each pixel element 25 is defined by the spatial light modulator 28. In an exemplary embodiment, each pixel element 25 corresponds to a mirror element of the spatial light modulator 28. FIG. 2 depicts build plane 20 as having far fewer pixel elements 25 than a real system for illustrative simplicity. In practice, build plane 20 can have one million or more individual pixel elements 25.

FIG. 3 is an electrical block diagram depicting light engine 10 which includes system processor 34 that is coupled to information storage device 36, light source module 35, and digital mirror device module 37. Light source module 35 includes light source driver 42 and light source 26. Digital mirror device module 37 includes image scaler 38, digital mirror device formatter 40, and digital mirror device 28.

System processor 34 orchestrates most or all of the major functions of the light engine 10. System processor 34 is configured to receive an incoming slice energy data array from controller 18 that defines at least a portion of a new layer of the article of manufacture 12. The incoming slice energy data array defines a two dimensional array of energy values that define optical cure energy to be applied versus position in X and Y. The spacing of the energy values in X and Y may or may not correspond to the pixel array on the spatial light modulator 28. The system processor 34 transmits the incoming slice energy data array to the image scaler 38 of the digital mirror device module 37.

Information storage device 36 can include one or more memory devices that store incoming or processed data for the system processor 34. Such data can include the incoming slice energy data array.

Image scaler 38 processes the incoming image slice data to provide one or more of correction, calibration, scaling, and stitching. Correction includes de-warping, and corrections for distortions such as barrel distortion and the keystone effect. Calibration can include compensation for light source 26 output and variation in an optical path length from the light engine 10 to the build plane 24. Scaling can include remapping and frame rescaling. Remapping is the conversion of the incoming data array spacing of energy values to the spacing of the pixel array of the spatial light modulator 28. Frame rescaling is the scaling of the energy values from a total energy per pixel element 25 to an energy value per pixel element for one frame. For example, if it takes 10 frames to provide a required cure time with light source 26, then the energy values would be reduced by 90% for each frame. Finally, stitching adjustments are performed when more than one light engine is used to define a build plane 24. In some alternative embodiments, part of the correction, calibration, scaling, and stitching can be performed by the controller before the data is passed to the digital mirror device module 37 or by the digital mirror device formatter 40. Then the image scaler 38 may not need to perform all of these functions. After these functions are performed, the image scaler 38 passes resultant scaled energy data array to the spatial light modulator formatter 40.

Figure 4:
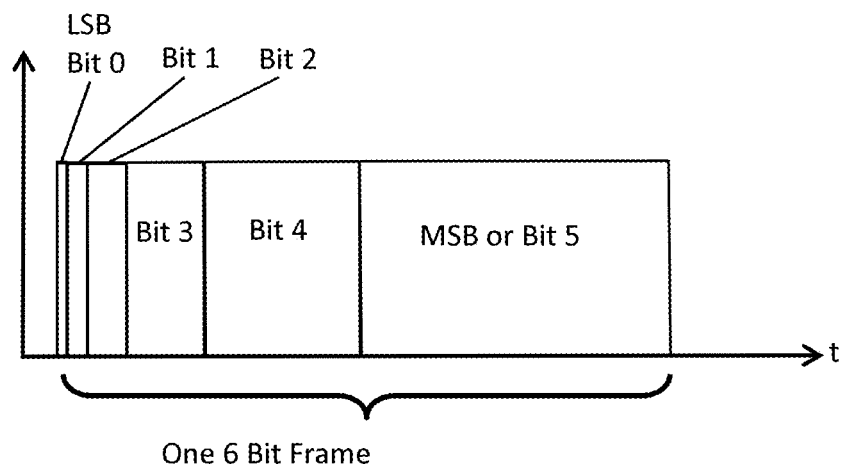
FIG. 4 is a timing diagram of an exemplary sequence of bit planes for one image frame.

Digital mirror device formatter 40 formats the scaled energy data array to a format compatible with the digital mirror device 28. The scaled energy data array has a scaled (for the frame period) energy value for each pixel. The digital mirror device formatter 40 converts each scaled energy value into a binary number corresponding to a sequence of bit planes. A sequence of bit planes is depicted in FIG. 4. Each bit plane is a time duration during which a pixel element is either on or off. When a binary value of 1 is sent for a given bit plane, the pixel element is then turned on during the bit plane time duration. When a binary value of 0 is sent for a given bit plane, the pixel element is turned off for the bit plane time duration. FIG. 4 illustrates a 6 bit image frame. The bit planes include a least significant bit (LSB) or bit zero that is the narrowest time duration defined for a mirror element to be on or off. The next most significant bit (bit one) has twice the time duration of bit zero. This repeats up to the most significant bit (MSB). While FIG. 4 depicts a six bit frame for simplicity, other systems may utilize 8 bit frames or more or less bits. A binary number of 101010 would have bit zero turned on, bit two turned off, but three turned on, and so on for a six bit frame. The binary number thus defines the frame data for a given pixel element. The digital mirror device formatter 40 sends the image frame data for the build plane 24 to the digital mirror device 28 which sequentially activates and deactivates the individual mirror elements accordingly.

The system processor 34 is configured to receive switching signals from controller 18 and to pass the switching signals to the light source driver 42 of the light source module 35. For embodiments having more than one light engine 10, the system processor 34 can also send the switching signals to other light engines 10. The light source driver 42 provides power to the light source 26. In an exemplary embodiment light source 26 is a light emitting diode (LED) that emits ultraviolet (UV) light. The switching signals include an "on" signal that activates (turns on) the light source 26 and an "off" signal that deactivates (turns off) the light source 26. In other embodiments the light source 26 includes one or more of a laser and a blue light emitter.

Also depicted in FIG. 3 is the transmission of light (thicker gray arrows 44 and 46) through the three dimensional printing system 2. Element 44 depicts the "raw" or unprocessed light emitted by the light source 26. Element 46 depicts the pixelated light that is reflected by the digital mirror device 28 and to optics that in turn deliver the pixelated light to the build plane 24.

Figure 5:
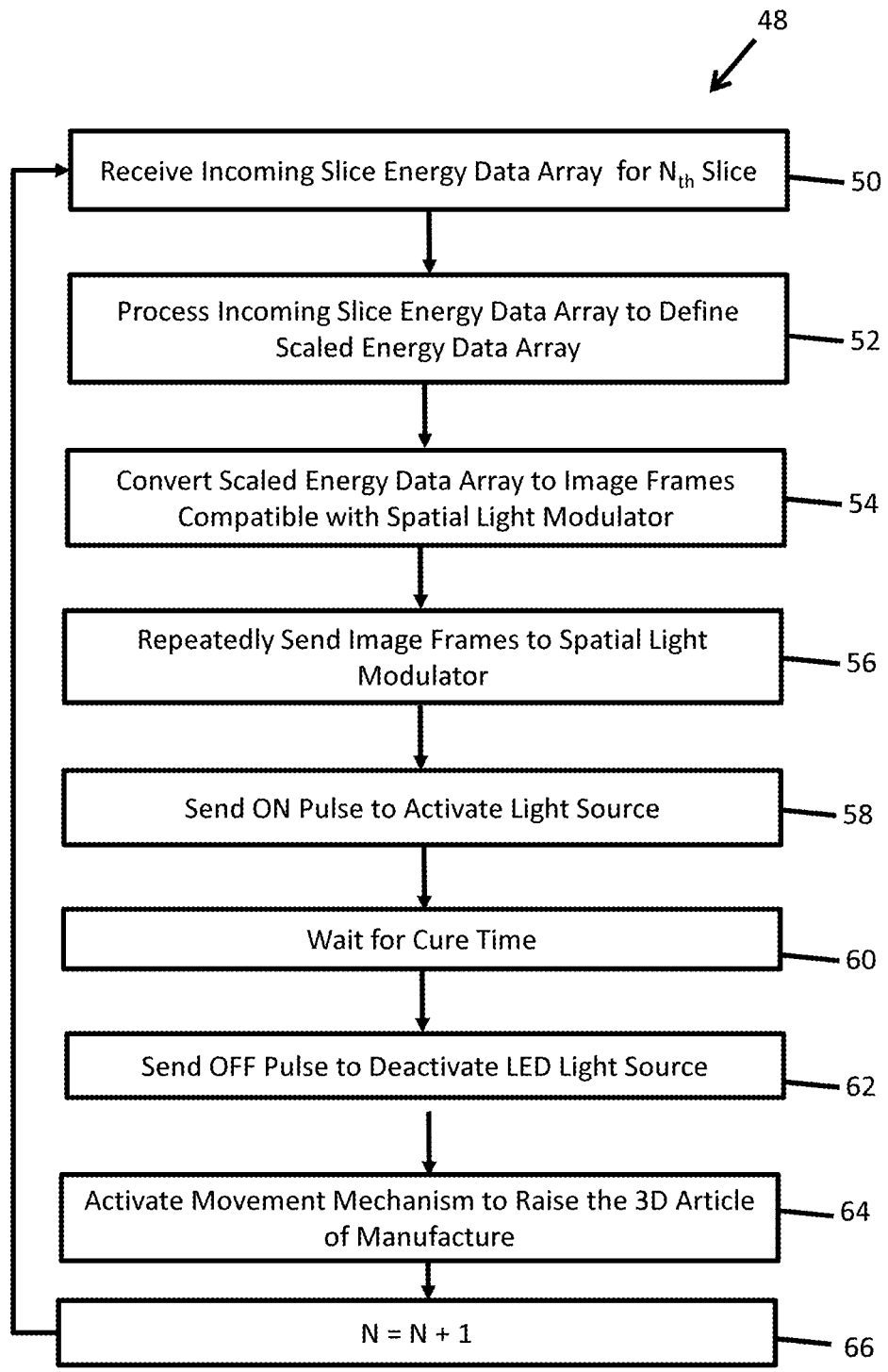
FIG. 5 is a flowchart of an exemplary method for operating a three dimensional printing system.
Figure 6:
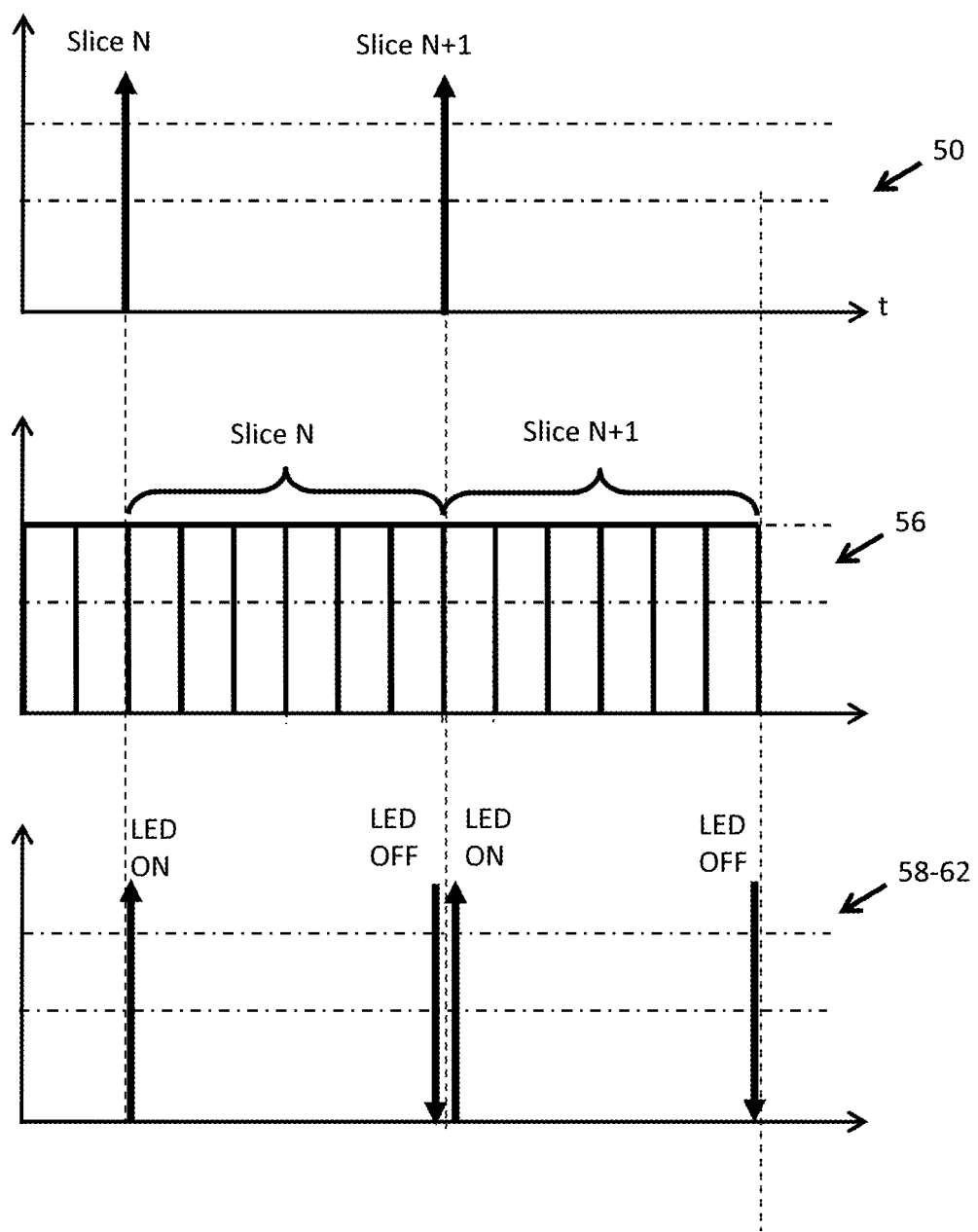
FIG. 6 is a timing diagram to illustrate an exemplary operational sequence for a three dimensional printing system.

FIG. 5 is a flowchart and FIG. 6 is a timing diagram depicting an exemplary method 48 of operation for the three dimensional printing system 2. According to step 50, the system processor 34 receives incoming slice N energy data array (from controller 18) to solidify an $N_{th}$ layer of the three dimensional article of manufacture 12. System processor 34 delivers the incoming slice N energy data array to the image scaler 38. Step 50 is depicted as the top graph in FIG. 6. Receipt of slice N and slice N+1 image data is represented as the up arrows.

According to step 52 the image scaler 38 processes the slice N image data to provide one or more of correction, calibration, scaling, and stitching. As an alternative, one or more of these functions can occur in controller 18 or in the digital mirror device formatter 40. One advantage over performing such functions in controller 18 is speed because the components of the digital mirror device module 37 has dedicated hardware that can perform these functions very rapidly. The image scaler 38 then delivers a scaled energy data array to digital mirror device formatter 40.

According to step 54 the digital mirror device formatter 40 converts the scaled energy data array to an image frame having representation of bit planes (as depicted in FIG. 4 for one image frame). According to step 56 the formatted image frame data is repeatedly sent to the digital mirror device 28. The middle graph of FIG. 6 depicts six image frames being sent to the digital mirror device 28 during a time duration that contains slice N. In general M frames are contained within a slice time duration and can vary from one frame to any number that are sufficient to properly solidify a layer of resin 6.

In some embodiments each frame has a time duration of $\frac{1}{30}^{th}$ of a second. A total cure time can be one or two seconds. A one second cure time would require 30 of such image frames. A two second cure time would require 60 image frames. In this exemplary embodiment one image frame may contain 8 bit planes. In other embodiments one image frame can contain 12, 16, 24, or more bit planes depending upon a desired energy resolution.

Other cure times are possible depending on the cure speed of the resin 6 being used. Other frame time durations are possible such as $\frac{1}{50}^{th}$ of a second, $\frac{1}{60}^{th}$ of a second, and so on. The number of bit planes during a frame can also vary depending upon the desired resolution.

Concurrent to the repeated sending of frames (step 56) steps 58 to 62 are performed. According to step 58 the system processor 34 receives an "on" switching signal from controller 18. As part of step 58 system processor 34 delivers the on signal to the light source driver 42 which then activates or turns on the light source 26.

According to step 60 the light source remains on during a cure time. During step 60 the digital mirror device formatter 40 continues to send image frames to the digital mirror device 28.

According to step 62 the system processor receives an "off" switching signal. As part of step 62 the system processor delivers the off signal to the light source driver 42 which then deactivates or turns off the light source 26.

In some embodiments the on and off signals are sent by the system processor to one or more subsidiary light engines 10. A subsidiary light engine 10 would have an architecture similar to that of discussed with respect to FIG. 3. Such an arrangement will be discussed with respect to FIGS. 7-10.

The lower timing diagram of FIG. 6 depicts steps 58-62. Arrows up indicate the light source 26 being turned on and the arrows down indicate the light source 26 being turned off. The horizontal axes of FIG. 6 indicate exemplary relative timing of receiving slice data, delivery of frames, and activation and deactivation of the light source 26. Various embodiments are possible.

In some embodiments activation of the light source 26 can be synchronized with the beginning of a frame. In other embodiments they are not synchronized but the light source on and off occurs sometime during the delivery of the frames.

In some embodiments an integer number of frames are delivered by the digital mirror device formatter 40 to the digital mirror device 28 during the cure time of step 60. In other embodiments a non-integer number of frames are delivered by the digital mirror device formatter 40 to the digital mirror device 28 during the cure time of step 60.

According to step 64 controller 18 activates movement mechanism 16 to incrementally move the 3D article of manufacture 12 upward. According to step 66 the value of N increments to N+1 so that the N+1 slice image data can be received by the system processor 34. The sequence 48 repeats until the 3D article of manufacture 12 is fully formed.

Figure 7:
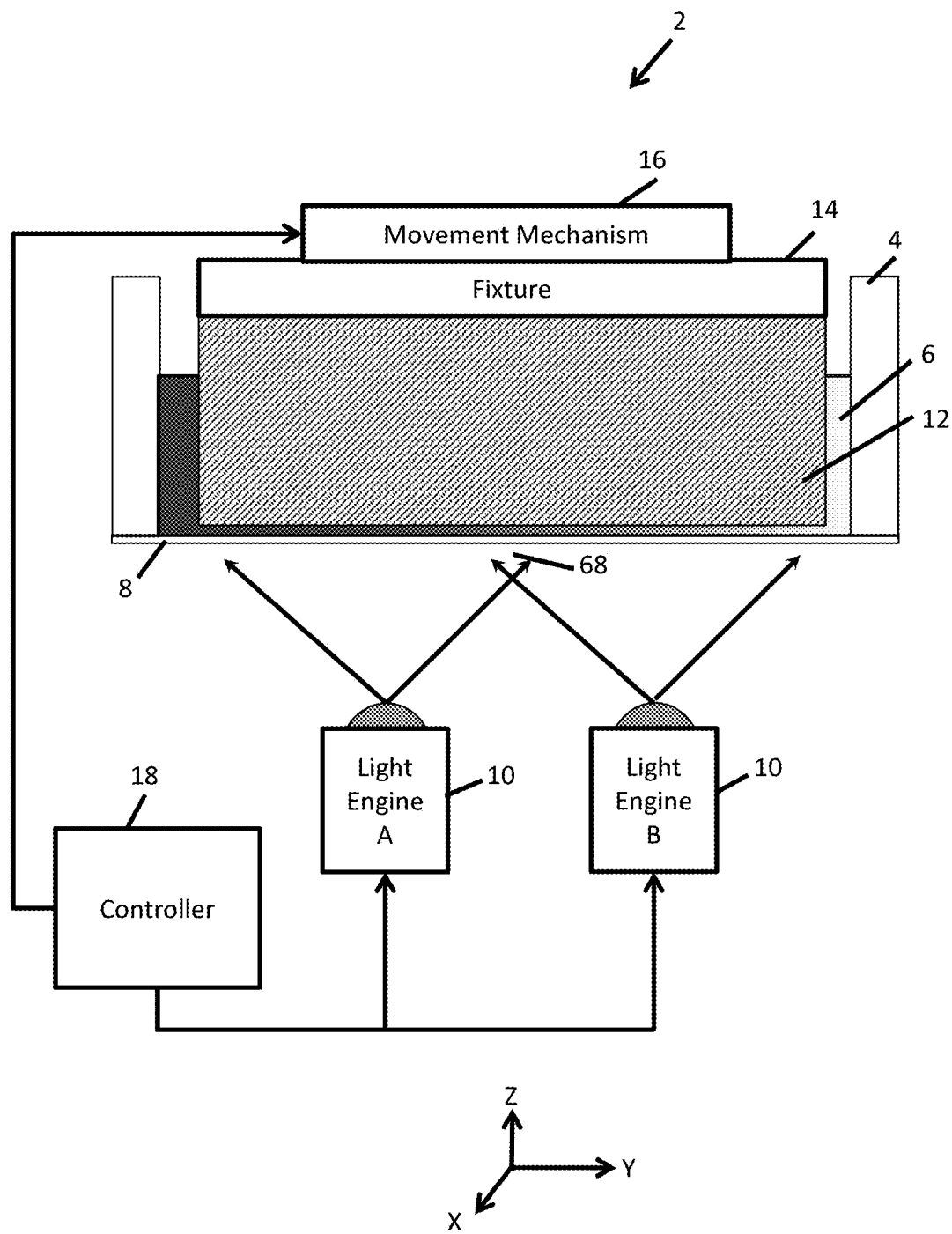
FIG. 7 is a schematic block diagram of a three dimensional printing system having two or more light engines.

FIG. 7 is a schematic block diagram of an exemplary three dimensional printing system 2 which is similar to that depicted in FIG. 1 except for the use of more than one light engine 10. This enables the imaging of laterally larger 3D articles of manufacturing 12 without a reduction in resolution. Otherwise like element numbers indicate like or similar elements.

The light engines 10 (light engine A and light engine B) have a zone of overlap 68 over which both light engines 10 provide energy to the same portion of the build plane 24. While two light engines 10 are shown, it is to be understood that the three dimensional printing system 2 can include one or more light engines 10 and can include any number of light engines 10.

Figure 8:
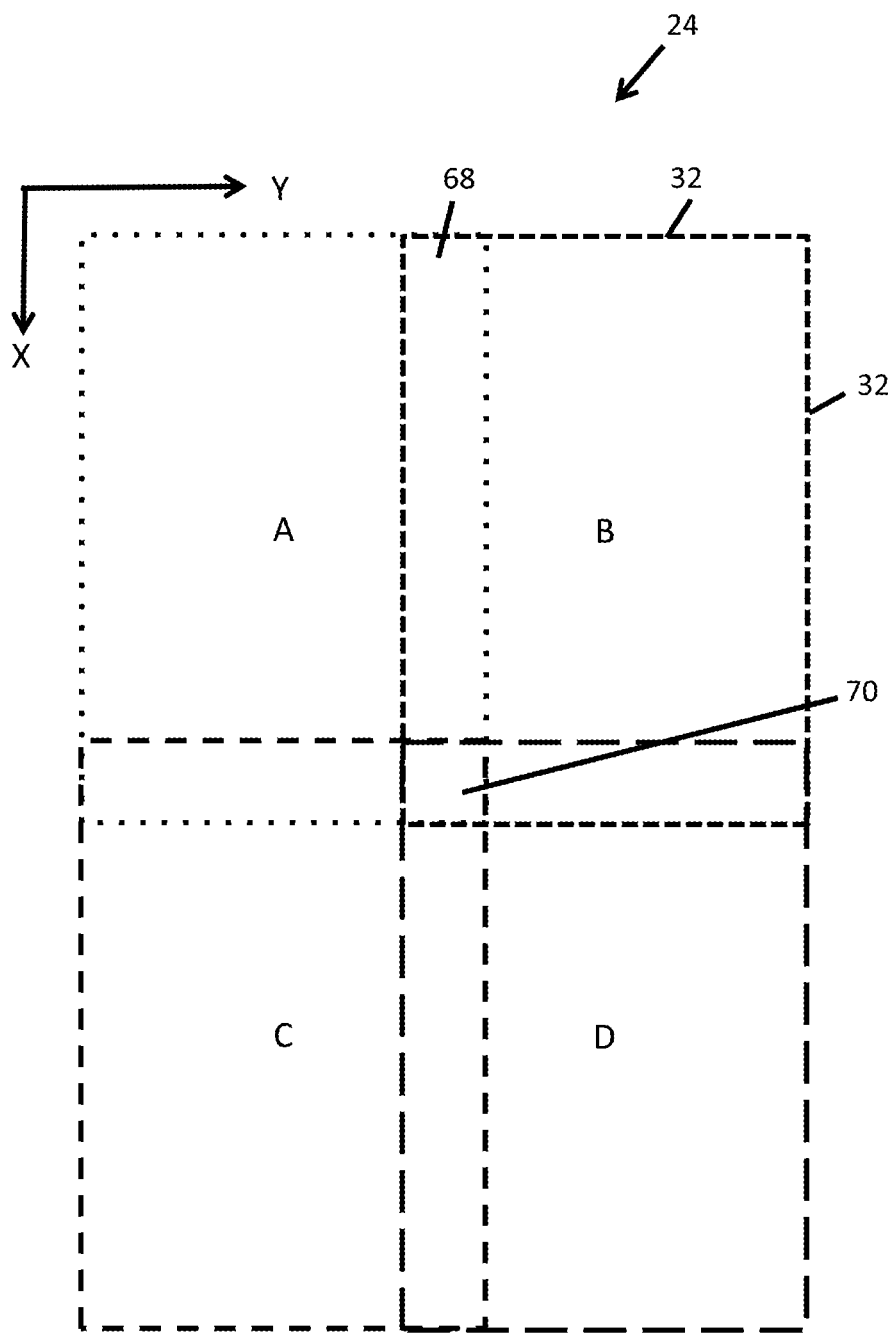
FIG. 8 is a diagram representing a composite build plane that is a composite of four partially overlapping build fields of four light engines.

FIG. 8 depicts a composite build plane 24 that is formed by a composite of four light engines A, B, C, and D. The different types of dashed outlines indicate overlapping build fields within the composite build plane 24 that are addressed by the light engines 10. For example, the upper left build field that is bounded by the dotted rectangle A is the field of build plane 24 that is addressed by light engine A. Each of the build fields has a non-overlapping field portion and an overlapping field portion. The overlapping field portion overlaps with one or more of the other build fields. The indicated field portion 68 is an area of build plane 24 over which build field A overlaps with build field B. Indicated build field portion 70 is an area of build plane 24 over which all four build fields A, B, C, and D overlap. The composite build plane 24 has an outer boundary 32 that is substantially rectangular but may have a different shape due to various distortions such as a keystone effect and/or barrel distortion. Also, each of build fields A, B, C, and D may be likewise distorted in shape.

Figure 9:
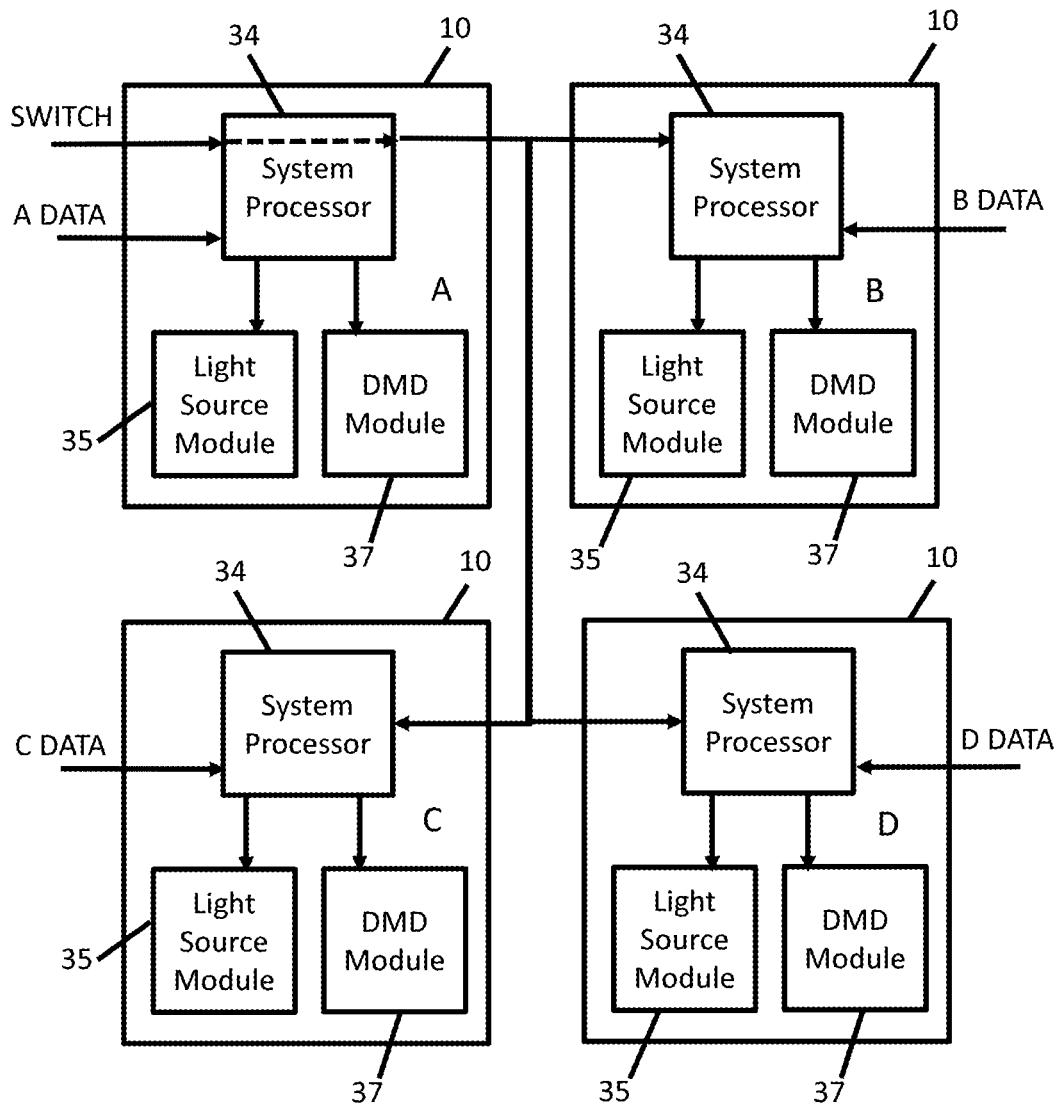
FIG. 9 is an electrical block diagram depicting four exemplary light engines.

FIG. 9 is an electrical block diagram depicting four exemplary light engines 10 according to capital letters A, B, C, and D. Refer to FIG. 3 to see additional details applicable to these light engines 10. The light engines 10 includes a master light engine A and three subsidiary light engines B, C, and D. The distinction between master and subsidiary light engines 10 is related to the routing of signals and controlling and timing of a cure cycle. The master light engine A delivers the switching signals to the subsidiary light engines B, C, and D whereby a cure cycle for all four light engines 10 can be simultaneous.

A light engine 10 includes a system processor 34 coupled to a light source module 35 and a digital mirror device module 37 (see FIG. 3 for more details). The system processor 34 is configured to receive data from controller 18 for each new layer of photocure resin to be selectively cured onto the article of manufacture 12. Data transmitted from controller 18 to light engines 10 includes incoming slice energy data arrays and switching signals.

The incoming slice energy data arrays are indicated in FIG. 9 by "A DATA", "B DATA", "C DATA", and "D DATA" for light engines A, B, C, and D respectively. The four data arrays define a slice for the composite build plane 24 illustrated in FIG. 8. As can be seen, the controller 18 provides incoming slice energy data arrays directly to the individual light engines 10. The data arrays are complementary and they individually include a non-overlapping array and an overlapping data array for a particular build field.

The switching signals are indicated by "SWITCH" in FIG. 9. The switching signals are received by the system processor 34 of master light engine A which delivers the switching signals the light source module 35 within master light engine A. System processor 34 of master light engine A also delivers the switching signals to the subsidiary light engines B, C, and D. The system processor within a subsidiary light engine 10 then sends the switching signals to the light source module 35 which operates in the same way as the light source module 35 of the master light engine 10. Having one master system processor 34 to receive and deliver the switching signals to subsidiary system processors 34 allows for synchronized and simultaneous operation of the light engines 10 which increases the speed of a three dimensional printing system 2 having multiple light engines 10.

Figure 10:
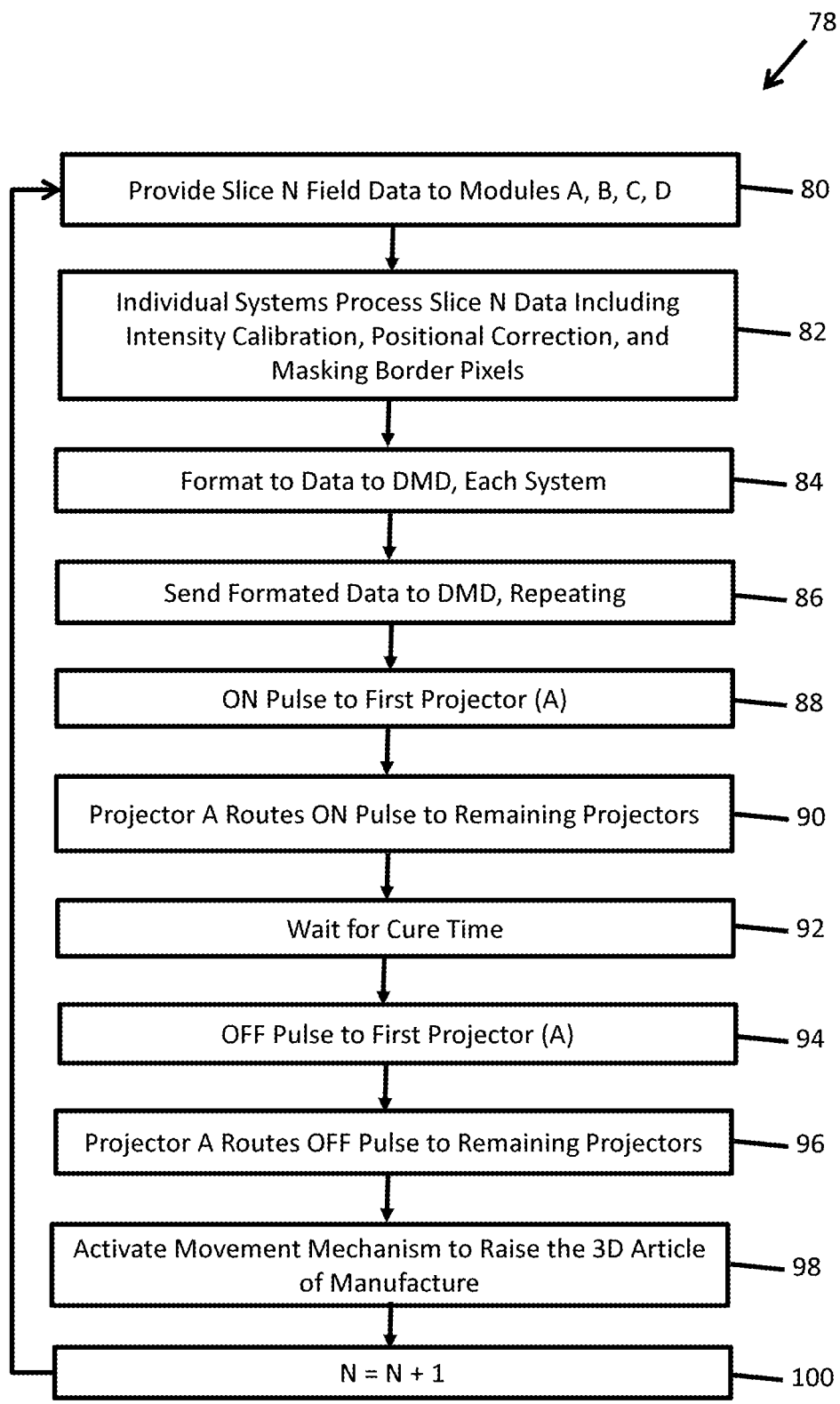
FIG. 10 is a flowchart of an exemplary method for operating a three dimensional printing system having more than one light engine.

FIG. 10 is a flowchart depicting a method 78 of operation of a three dimensional printing system 2 having more than one light engine 10. According to step 80 the controller 18 sends a slice N energy data array to each of light engines A, B, C, and D. Slice N data refers to data that defines an $N_{th}$ layer of a three dimensional article of manufacture 12. The data received by a particular light engine 10 (A, B, C, or D) is different than the other light engines since it defines one build field which has a portion that overlaps the three other build fields and a non-overlapping portion that is unique to that light engine.

According to step 82 the individual light engines 10 separately process the incoming slice N energy data arrays using image scaler 38. Step 82 is similar to step 52 of FIG. 5 except that step 82 includes separate processing for the light engines 10. According to step 84 the data from step 82 is formatted for the individual spatial light modulators 28. According to step 86 image frames are repeatedly sent to light modulators 28. For a given light engine 10, this is the same as step 56 of FIG. 5 and the middle graph of FIG. 6.

According to step 88 the controller 18 sends an on pulse to the system processor 34 of master light engine A. According to step 90 the system processor 34 of master light engine A routes the on signal to the system processors 34 for the subsidiary light engines B, C, and D. Also as part of step 90 the system processors 34 activate the light sources 26 for all of the light engines A, B, C, and D simultaneously. According to step 92 the light sources 26 are on for a cure time for the layer N. According to step 94 the system processor 34 of master light engine A receives an "off" signal. According to step 96 the system processor 34 of light source A routes the off signal to the system processors 34 for the subsidiary light sources B, C, and D. Also as part of step 96 the system processors 34 deactivate the light sources 26 for all of the light engines A, B, C, and D simultaneously.

During the cure time 92 a plurality of the image frames are sent to the digital mirror devices 28 for the individual light engines 10. The timing diagram depicted in FIG. 6 depicts a similar sequence if 50 is replaced by step 80, step 56 is replaced by step 86, and steps 58-62 are replaced with steps 88-96. As before the cure time 92 can contain an integer or non-integer number of image frames. The start of the cure time can be synchronized or not synchronized to the start of an image frame.

According to step 98 the movement mechanism 16 moves the three dimensionally article of manufacture 12 incrementally upward. According to step 100 the N increments to N+1 for the next slice image data to be delivered from controller 18 to the light engines 10. Steps 80 to 100 can be repeated until the three dimensional article of manufacture 12 is completed.

The specific embodiments and applications thereof described above are for illustrative purposes only and do not preclude modifications and variations encompassed by the scope of the following claims. For example, while FIGS. 8-10 are described for four light engines 10, the technique of the disclosure can be applied to any number of light engines 10.

What we claim is:
1. A method of manufacturing a three dimensional article comprising:
  providing a three dimensional printing system including:
    a vessel containing photocure resin; and
    a light engine including a controller and a light source that illuminates a spatial light modulator, the controller is configured to operate portions of the light engine; and
  fabricating the three dimensional article by forming a sequence of selectively hardened layers of the photocure resin, the sequence of selectively hardened layers of photocure resin are individually formed by operating the three dimensional printing system including the following steps for an individual one of the sequence of selectively hardened layers:
    processing an incoming slice energy data array to provide a defined image frame;
    activating the light source to provide the light source in an ON state;
    concurrent with the light source being in the ON state, repeatedly sending the defined image frame to the spatial light modulator; and
    deactivate the light source to an OFF state.

2. The method of claim 1 wherein the spatial light modulator is a digital mirror array which includes at least one million individually controllable mirror elements.

3. The method of claim 1 wherein the defined image frame includes a binary sequence of bit planes having a varying time duration.

4. The method of claim 1 wherein operating the three dimensional printer further includes receiving the incoming slice energy data array and processing the incoming slice energy data array.

5. The method of claim 1 wherein activating the light source occurs before repeatedly sending the defined image frame to the light modulator.

6. The method of claim 1 wherein activating the light source occurs while repeatedly sending the defined image frame to the light modulator.

7. The method of claim 1 wherein repeatedly sending the defined image frame consists of sending an integer number of the defined image frame image to the light modulator during a time period between the ON state and the OFF state of the light source.

8. The method of claim 1 wherein repeatedly sending the defined image frame consists of sending a non-integer number of the defined image frame to the light modulator during a time period between the ON state and the OFF state of the light source.

9. A method of manufacturing a three dimensional article comprising:
providing a three dimensional printing system including:
a vessel for containing a photocure resin;
a light engine including:
a system processor;
digital mirror device module including a digital mirror device; and
a light source module including a light source for illuminating the digital mirror device; and
fabricating the three dimensional article by forming a sequence of selectively hardened layers of the photocure resin, the sequence of selectively hardened layers of the photocure resin are individually formed by operating the three dimensional printing system including:
receiving and delivering an ON switching signal along a second data path from the system processor to the light source module to place the light source in an ON state;
concurrently with the light source being in the ON state, repeatedly delivering a defined image frame to the digital mirror device along a first data path; and
receiving and delivering an OFF signal along the second data path from the system processor to the light source module to place the light source in an OFF state.

10. The method of claim 9 wherein the spatial light modulator is a digital mirror array which includes at least one million individually controllable mirror elements.

11. The method of claim 9 wherein the defined image frame includes a binary sequence of bit planes having a varying time duration.

12. The method of claim 9 wherein operating the three dimensional printer further includes receiving an incoming slice energy data array and processing the incoming slice energy data array to define the defined image frame.

13. The method of claim 12 wherein the light engine includes a digital mirror device module containing a digital mirror device formatter and the digital mirror device.

14. The method of claim 13 wherein the digital mirror device formatter receives the incoming slice energy data array and then repeatedly generates the defined image frame.

15. The method of claim 9 wherein an integer number of the defined image frame is sent to the light modulator during a time period between the ON state and the OFF state of the light source.

16. The method of claim 9 wherein a non-integer number of the defined image frame is sent to the light modulator during a time period between the ON state and the OFF state of the light source.

17. A method of manufacturing a three dimensional article comprising:
providing a three dimensional printing system including:
a vessel for containing photocure resin;
a first light engine including a first system processor and a first light source that illuminates a first spatial light modulator, the first light engine configured to illuminate a first build field within the vessel;
a second light engine including a second system processor and a second light source that illuminates a second spatial light modulator, the second light engine configured to illuminate a second build field within the vessel, the first build field and the second build field partly but do not completely overlap;
fabricating the three dimensional article by forming a sequence of layers, an individual layer of the sequence of layers formed by operating the three dimensional printing system including:
activating the first and second light sources to provide both the first and second light sources in an ON state;
concurrent with the ON state of both the first and second light sources, repeatedly sending a first defined image frame to the first spatial light modulator and repeatedly sending a second defined image frame to the second spatial light modulator; and
deactivating the first and second light sources to an OFF state.

18. The method of claim 17 wherein the first spatial light modulator is a digital mirror array which includes at least one million individually controllable mirror elements.

19. The method of claim 17 wherein an integer number of each of the first defined image frame and the second defined image frame are sent to the first light modulator and the second light modulator respectively during a time period between the ON state and the OFF state of the first and second light sources.

20. The method of claim 17 wherein a non-integer number of each of the first defined image frame and the second defined image frame image frames are sent to first light modulator and the second light modulator respectively during a time period between the ON state and the OFF state of the first and second light sources.

* * * * *